United States Patent
Sakarda

(10) Patent No.: US 9,619,284 B2
(45) Date of Patent: Apr. 11, 2017

(54) DYNAMICALLY SWITCHING A WORKLOAD BETWEEN HETEROGENEOUS CORES OF A PROCESSOR

(71) Applicant: Intel Corporation, Santa Clara, CA (US)

(72) Inventor: Premanand Sakarda, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 13/645,081

(22) Filed: Oct. 4, 2012

(65) Prior Publication Data

US 2014/0101411 A1    Apr. 10, 2014

(51) Int. Cl.
*G06F 9/48* (2006.01)
*G06F 9/38* (2006.01)
*G06F 1/32* (2006.01)

(52) U.S. Cl.
CPC .......... *G06F 9/4893* (2013.01); *G06F 1/329* (2013.01); *G06F 9/3885* (2013.01); *G06F 2209/5019* (2013.01)

(58) Field of Classification Search
CPC .................................................. G06F 11/0724
USPC ........................................................ 712/28
See application file for complete search history.

(56) References Cited

U.S. PATENT DOCUMENTS

| | | | |
|---|---|---|---|
| 6,449,683 B1 * | 9/2002 | Silvester | 711/103 |
| 6,687,838 B2 * | 2/2004 | Orenstien et al. | 713/320 |
| 6,820,263 B1 * | 11/2004 | Klappholz | 718/108 |
| 8,024,590 B2 | 9/2011 | Song et al. | |
| 8,122,269 B2 | 2/2012 | Houlihan et al. | |
| 8,281,308 B1 | 10/2012 | Cheng et al. | |
| 2006/0090161 A1 | 4/2006 | Bodas et al. | |
| 2006/0161799 A1 * | 7/2006 | Degenhardt | 713/600 |
| 2008/0126748 A1 * | 5/2008 | Capps et al. | 712/30 |
| 2008/0250260 A1 * | 10/2008 | Tomita | G06F 11/30 713/324 |
| 2008/0263324 A1 | 10/2008 | Sutardja et al. | |
| 2008/0288748 A1 * | 11/2008 | Sutardja et al. | 712/20 |
| 2008/0295105 A1 * | 11/2008 | Ozer et al. | 718/103 |
| 2009/0077564 A1 | 3/2009 | Loeser | |
| 2009/0083554 A1 * | 3/2009 | Belmont | G06F 1/3228 713/300 |
| 2010/0333113 A1 | 12/2010 | Johnson et al. | |

(Continued)

FOREIGN PATENT DOCUMENTS

| | | |
|---|---|---|
| CN | 101790709 | 7/2010 |
| WO | 2009125257 | 10/2009 |

OTHER PUBLICATIONS

Ren, et al., Energy-Efficient Scheduling of Interactive Services on Heterogeneous Multicore Processors, Date!?, 1-13.

(Continued)

*Primary Examiner* — Andrew Caldwell
*Assistant Examiner* — Michael Metzger
(74) *Attorney, Agent, or Firm* — Trop, Pruner & Hu, P.C.

(57) ABSTRACT

In one embodiment, a policy manager may receive operating system scheduling information, performance prediction information for at least one future quantum, and current processor utilization information, and determine a performance prediction for a future quantum and whether to cause a switch between asymmetric cores of a multicore processor based at least in part on this received information. Other embodiments are described and claimed.

19 Claims, 6 Drawing Sheets

(56) References Cited

U.S. PATENT DOCUMENTS

| | | | |
|---|---|---|---|
| 2011/0022871 | A1 | 1/2011 | Bouvier et al. |
| 2011/0213947 | A1* | 9/2011 | Mathieson et al. ............ 712/16 |
| 2012/0060170 | A1 | 3/2012 | Vajda |
| 2012/0079235 | A1 | 3/2012 | Iyer et al. |
| 2012/0227048 | A1 | 9/2012 | Elnozahy et al. |
| 2012/0233477 | A1 | 9/2012 | Wu et al. |

OTHER PUBLICATIONS

Panneerselvam, et al., Chameleon: Operating System Support for Dynamic Processors, Mar. 3-7, 2012, 99-110, London, England.
International Searching Authority, "Notification of Transmittal of the International Search Report and the Written Opinion of the International Searching Authority," mailed Jan. 29, 2014, in International application No. PCT/US2013/060566.
Annamalai, et al., "Dynamic Thread Scheduling in Asymmetric Multicores to Maximize Performance-per-Watt", 2012, 964-971, IEEE Computer Society.
Kwon, et al., "Virtualizing Performance Asymmetric Multi-core Systems", Jun. 4-8, 2011, 12 pages, San Jose, California.
Fedorova, Alexandra, et al., "Maximizing Power Efficiency with Asymmetric Multicore Systems", Dec. 2009, 48-57.
Saez, et al., "A Comprehensive Scheduler for Asymmetric Multicore Systems", Apr. 13-16, 2010, 14 pages, Paris, France.
Al-Otoom, et al., "EXACT: Explicit Dynamic-Branch Prediction with Active Updates", May 17-19, 2010, 165-176, Bertinoro, Italy.
Mogul, et al., "Using Asymmetric Single-ISA CMPS to Save Energy on Operating Systems", 2008, 26-41, Palo Alto, CA.
Poovey, et al., "Pattern-Aware Dynamic Thread Mapping Mechanisms for Asymmetric Manycore Architectures", Technical Report No. 2011-1, 2011, 22 pages, Tinker Research Publications.
Gupta, et al., "The Forgotten 'Uncore': On the Energy-Efficiency of Heterogeneous Cores", USENIX annual Technical Conference, 2012, 1-6.
Moshovos, et al., "JETTY: Filtering Snoops for Reduced Energy Consumption in SMP Servers", HPCA Seventh International Symposium on High Performance Computer Architecture, 2001, 85-96.
Ghosh, et al., "Efficient System-on-Chip Energy Management with a Segmented Bloom Filter", 2006, 283-297.
Curtis-Maury, et al., "Online Power Performance Adaptation of Multithreaded Programs using Hardware Event Based Prediction", 2006, 10 pages, Queensland, Australia.
Ventroux, et al., "SCMP Architecture: An Asymmetric Multiprocessor System-on-Chip for Dynamic Applications", ACM International Forum on Next Generation Multicore/Manycore Technologies, 2010, 12 pages, Saint-Malo, France.
Vaidya, et al., "Dynamic Scheduler for Multi-core Systems", 2010, 13-16, Maharashtra, India.
Agrou, et al., "A Design Approach for Predictable and Efficient Multi-Core Processor for Avionics", Oct. 16-20, 2011, 1-11.
Gulati, et al., "Multitasking Workload Scheduling on Flexible-Core Chip Multiprocessors", Oct. 25-29, 2008, 10 pages, Ontario, Canada.
Gupta, et al., "HeteroMates: Providing High Dynamic Power Range on Client Devices using Heterogeneous Core Groups", 2012, 10 pages.
Wang, et al., "A Programmable Microsystem Using System-on-Chip for Real-Time Biotelemetry", Jul. 2005, 1251-1260.
Li, et al., "Efficient Operating System Scheduling for Performance-Asymmetric Multi-Core Architectures", Nov. 10-16, 2007, 11 pages, Nevada, USA.
Chan, Jeremy, "Energy-Aware Synthesis for Networks on Chip Architectures", 2008, 249 pages.
Kumar, et al., "Heterogeneous Chip Multiprocessors", Nov. 2005, 32-38.
Lefurgy, et al., "Energy Management for Commercial Servers", Dec. 2003, 39-48.
Ghosh, et al., "ASPEN: An Asynchronous Signal Processor for Energy Efficient Sensor Nodes", 2010, 268-272.
Yeh, et al., "Low-Power, Highperformance Architecture of the Pwrficient Processor Family", 2007, 69-78.
Monchiero, et al., "Efficient Synchronization for Embedded On-Chip Multiprocessors", Oct. 2006, 1049-1062.
Gupta, et al., "Extending the Dynamic Power Range of Client Devices using Heterogeneous Processors", Feb. 2012, 6 pages, New Orleans, LA.
Aalto, "Dynamic management of multiple operating systems in an embedded multi-core environment", May 2010, 80 pages.
Sharifi, et al., "Hybrid Dynamic Energy and Thermal Management in Heterogeneous Embedded Multiprocessor SoCs", ASP-DAC, 2010, 873-878.
Sawalha, et al., "Energy-Efficient Phase-Aware Scheduling for Heterogeneous Multicore Processors", 2012, 6 pages.
Craeynest, et al., "Scheduling Heterogeneous Multi-Cores through Performance Impact Estimation (PIE)", ISC, Jun. 2012, 12 pages, Portland, OR.
Ren, et al., "Energy-Efficient Scheduling of Interactive Services on Heterogeneous Multicore Processors", May 2012, 1-13.
Panneerselvam, et al., "Chameleon: Operating System Support for Dynamic Processors", Mar. 3-7, 2012, 99-110, London, England.
Chawade, et al., "Review of XY Routing Algorithm for Network-on-Chip Architecture", Apr. 2012, 20-23.
Strong, et al., "Fast Switching of Threads Between Cores", Apr. 2009, 1-11.
Rodrigues, et al., "Performance Per Watt Benefits of Dynamic Core Morphing in Asymmetric Multicores", Proc. of the 2011 IEEE Conf. on Parallel Architectures and Compilation Techniques (PACT'11), Oct. 2011, 10 pages.
Sondag, et al., "Phase-guided Auto-Tuning for Improved Utilization of Performance-Asymmetric Multicore Processors", Mar. 16, 2009, 11 pages, Ames, Iowa.
Patsilaras, et al., "Efficiently Exploiting Memory Level Parallelism on Asymmetric Coupled Cores in the Dark Silicon Era", Jan. 2012, 28:1-28:21, New York, USA.
Cullmann, et al., "Predictability Considerations in the Design of Multi-Core Embedded Systems", Ingénieurs de l'Automobile, Sep. 2010, 36-42, vol. 807.
Murali, et al., "Temperature-Aware Processor Frequency Assignment for MPSoCs Using Convex Optimization", Oct. 2007, 111-116, Salzburg, Austria.
Sawalha, et al., "Phase-guided Scheduling on Single-ISA Heterogeneous Multicore Processors", 2011, 736-745.
Rossi, et al., "A Multi-Core Signal Processor for Heterogeneous Reconfigurable Computing", 2009, 106-109.
Zydek, Dawid, "Processor allocator for chip multiprocessors", Apr. 1, 2010, 169 pages, Las Vegas, NV.
Savva, et al., "Intelligent On/Off Dynamic Link Management for On-Chip Networks", 2012, 1-12.
Burns, Chris, "NVIDIA details Variable SMP, the brain of quad core mobile computing", Sep. 20, 2011, 1 page.
Annamalai, et al., Dynamic Thread Scheduling in Asymmetric Multicores to Maximize Performance-per-Watt, Date??, 8 pages.
Kwon, et al., Virtualizing Performance Asymmetric Multi-core Systems, Jun. 4-8, 2011, 12 pages, San Jose, California.
Fedorova, Alexandra, et al., Maximizing Power Efficiency with Asymmetric Multicore Systems, Dec. 2009, 48-57.
Saez, et al., A Comprehensive Scheduler for Asymmetric Multicore Systems, Apr. 13-16, 2010, 14 pages, Paris, France.
Al-Otoom, et al., Exact: Explicit Dynamic-Branch Prediction with Active Updates, May 17-19, 2010, 165-176, Bertinoro, Italy.
Mogul, et al., Using Asymmetric Single-ISA CMPS to Save Energy on Operating Systems, 2008, 26-41, Palo Alto, CA.
Poovey, et al., Pattern-Aware Dynamic Thread Mapping Mechanisms for Asymmetric Manycore Architectures, Date??, 22 pages.
Gupta, et al., The Forgotten 'Uncore': On the Energy-Efficiency of Heterogeneous Cores, Date???, 1-6.
Moshovos, et al., Jetty: Filtering Snoops for Reduced Energy Consumption in SMP Servers, Date??, 12 pages.
Ghosh, et al., Efficient System-on-Chip Energy Management with a Segmented Bloom Filter, 2006, 283-297.

(56) References Cited

OTHER PUBLICATIONS

Curtis-Maury, et al., Online PowerPerformance Adaptation of Multithreaded Programs using Hardware Event Based Prediction, 2006, Queensland, Australia, 10 pages.
Ventroux, et al., SCMP Architecture: An Asymmetric Multiprocessor System-on-Chip for Dynamic Applications, Date???, Gif-sur-Yvette, France, 12 pages.
Vaidya, et al., Dynamic Scheduler for Multi-core Systems, 2010, Maharashtra, India, 13-16.
State Intellectual Property Office of the People's Republic of China, First Office Action mailed, Jun. 28, 2016 in Chinese Patent Application No. 2013800461181.
European Patent Office, Extended European Search Report mailed Nov. 17, 2016 in European Patent Application No. 13844447.6.

* cited by examiner

DYNAMICALLY SWITCHING A WORKLOAD BETWEEN HETEROGENEOUS CORES OF A PROCESSOR

BACKGROUND

As performance demand increases in computing devices such as smartphones and tablet computers among other computing devices, multiple core processors are becoming more prevalent to deliver the performance desired for high intensity workloads and multithreaded applications. However with this increase, power consumption of the processor also increases, thereby increasing the overall power consumed by a platform. This is a problem as the overall available total power for many platforms, particularly portable platforms, is limited. Current mechanisms, which provide fixed scheduling of certain workloads to particular cores or require significant overhead in dynamically scaling performance, create much complexity.

DETAILED DESCRIPTION

Via a prediction algorithm in accordance with an embodiment of the present invention, processor performance may be dynamically scaled by dynamically switching between cores having different characteristics. For example, a workload being executed on two or more low power simultaneous multiprocessor (SMP) cores can be switched to be executed on two or more high performance SMP cores, e.g., of a quad core or higher system on chip (SoC).

In one embodiment, a combination of dynamic workload characterization and the prediction algorithm may be used to determine an appropriate core selection for an upcoming execution quantum. In an embodiment, the workload characterization may be realized using one or more profilers available within a system. For example, a processor may include a performance monitoring unit, from which information to profile operation of the central processing unit (CPU) can be obtained. Also via this unit or via an independent profiler for a memory system, memory profile information can be obtained. Of course, additional profilers may be present in some embodiments, such as an interconnect profiler to determine bandwidth operations on one or more interconnects (such as a processor internal interconnect and a memory interconnect).

In addition, the prediction algorithm may receive scheduling information. This information may be obtained from the operating system (OS) scheduler pipeline as soon as it is scheduled but before the schedule is executed. From all of this information, the algorithm may predict the performance to accommodate scheduled workloads at subsequent times $Pt+1, Pt+2, Pt+3 \ldots Pt+n$, where $Pt$ is the performance level predicted at any given instance of time and $Pt+1$ is the performance at the next instance of time. In an embodiment, these time quanta may correspond to a thread quantum or a time slice for which an OS schedules a workload for execution. As one such example, each quantum may be between approximately 50 and 100 milliseconds. The algorithm can determine the performance desired for the $n^{th}$ thread quantum in the operating system pipeline.

The CPU and memory profiler uses the performance monitoring unit to profile the system and reads various counters to determine the current CPU utilization and memory throughput at a given instance of time. In an embodiment, these utilization values may be compared to one or more thresholds, and based on such comparison(s) it can be determined whether a core switch or performance level change is to occur.

Figure 1:
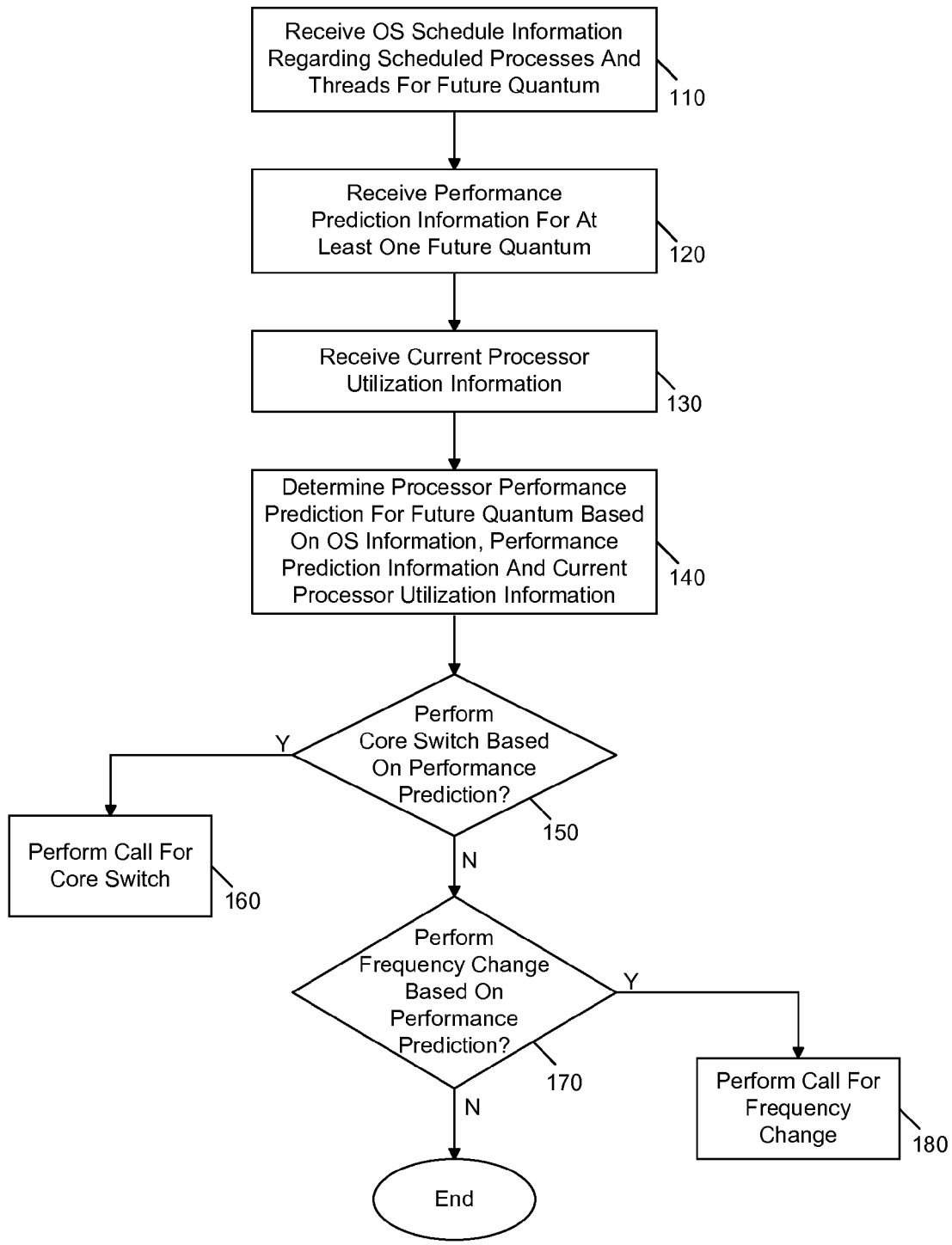
FIG. 1 is a flow diagram of a method in accordance with an embodiment of the present invention.

Referring now to FIG. 1, shown is a flow diagram of a method in accordance with an embodiment of the present invention. More specifically, FIG. 1 shows a prediction method 100 which can be implemented via a policy manager that may be executed, in different embodiments within firmware, an OS, or an independent controller of a processor such as a power controller.

As seen in FIG. 1, method 100 may begin by receiving OS schedule information (block 110). More specifically, this OS schedule information may be received from the OS scheduler and can include information regarding scheduled processes and threads for a future time quantum. Note that in an embodiment, this schedule information received from the scheduler may include the number of processes scheduled for the future time quantum and the number of threads that are to execute in such quantum. In an embodiment this OS schedule information may be obtained from a run queue that the OS scheduler populates with scheduling decisions for future time quanta.

In general, a scheduling queue may be populated by the OS and may include multiple entries, where for each thread quantum one or more of these entries may be selected for execution. In general, each entry may include a process identifier and a thread identifier. Entries of a single process may have a common process identifier and different thread identifiers to thus indicate the presence of multiple threads for that process. Note that in general, a process may be created, and this process may in turn include one or more threads. One or more threads may concurrently execute on one or more cores of a multiprocessor such as an SMP processor.

Still referring to FIG. 1 at block 120 performance prediction information may be received for at least one future quantum. This performance prediction information may correspond to a previous prediction generated by the policy manager for a given time quantum that has yet to occur. At block 130 current processor utilization information also may be received. Various types of information may be received in different embodiments. For example, in a processor having a performance monitoring unit, the values of different counters may be received. From these counts, different processor metrics can be identified or derived. For example, instructions per cycle may be determined and a CPU utilization rate, which may be a percentage of active utilization of a processor during a time quantum, may be obtained. Additional current processor utilization information such as various interconnect metrics and memory metrics, among many others may be obtained, in some embodiments.

Still referring to FIG. 1, from all of this information a processor performance prediction may be determined for a future quantum (block 140). Although the scope of the present invention is not limited in this regard, this performance prediction may be in terms of a given performance state, e.g., in accordance with the power states detailed in an Advanced Configuration and Power Interface (ACPI) specification such as the Advanced Configuration and Power Interface Specification, revision 3.0b, Oct. 10, 2006 (e.g., a given one of power states $P_0$-$P_N$). As such, this performance prediction may be made in terms of frequency, in an embodiment. And from this frequency, an appropriate core is selected and a decision is made as to whether switching between SMP cores is to occur.

Different manners of determining this processor performance prediction can be made in different embodiments. In one embodiment, a calculation can be based on a predetermined function that receives as inputs the above information, including scheduling information, performance prediction information, and current processor utilization information. The prediction algorithm takes the inputs from the scheduler pipeline and predicts the performance needed and causes a dynamic switch between the SMP cores and/or adjustment to core frequency. In an embodiment, the prediction algorithm takes the following as the inputs from the scheduler pipeline: number of scheduled threads in the scheduler pipeline for each core at given instance of time (e.g., t1, t2, t3, t4 . . . tn); and number of active processes in the scheduler pipeline for each core at given instance of time (e.g., p1, p2, p3, p4 . . . pn). In addition, the prediction algorithm receives as input the current processor utilization information.

The predicted performance for a given quantum t (Pt) is, in one embodiment, a function of the number of scheduled threads, number of active processes and performance needed by each thread. The estimated performance needed by each thread may be computed, in some embodiments, using utilization information for the thread. As one such example, a current CPU and memory bus utilization for that thread may be used in the determination.

Thus in one embodiment, the predicted CPU performance level is computed based on profiling current CPU utilization and memory bus utilization as follows: Pt=F {f(t1, t2, t3, t4 . . . tn, p1, p2, p3, p4 . . . pn, Pt+1, Pt+2, Pt+3 . . . Pt+n), current CPU utilization, memory bus utilization, IPC and data cache miss rate}. This predicted performance level may be computed in different terms. However, in one embodiment the predicted performance level may be computed in terms of a performance level, e.g., corresponding to a core frequency.

As further seen in FIG. 1, next control passes to diamond 150 where it can be determined whether a core switch is to be performed based on the performance prediction. This determination of whether a switch is to be performed can be made in various manners. However, for purposes of discussion assume that if a markedly different performance prediction is identified than a current performance level of the processor, a determination of a core switch can be made (e.g., a performance prediction of a 2.0 gigahertz (GHz) frequency while the current performance of the processor is at 600 megahertz (MHz) may be sufficient to cause a core switch). Note that this determination as to a core switch is for a future quantum. Thus instead of immediately performing the switch, the identification of this core switch can be placed into a core switch queue to later be accessed when the given thread quanta is about to execute. Note that the prediction is for the determined performance for a future time. Depending upon the predicted performance needs, frequency is determined and depending upon the frequency, the most efficient core is selected. Once this selection is made, it is then determined whether core switching is to be performed.

Still referring to FIG. 1, if a core switch determination is made, control passes to block 160 where a call can be made to perform the core switch. In an embodiment, this call may be a given type of system call, details of which will be described further below. Otherwise, if the performance prediction is not substantially different than a current performance level of the processor such that a core switch is to occur, control instead passes from diamond 150 to diamond 170. There, it can be determined whether a change to a frequency of a core should be performed. If so, control passes to block 180, where a call for a frequency change can be made, e.g., to firmware or hardware such as a power controller of the processor. If instead, this determination is in the negative, no action may occur and the method may conclude.

Figure 2:
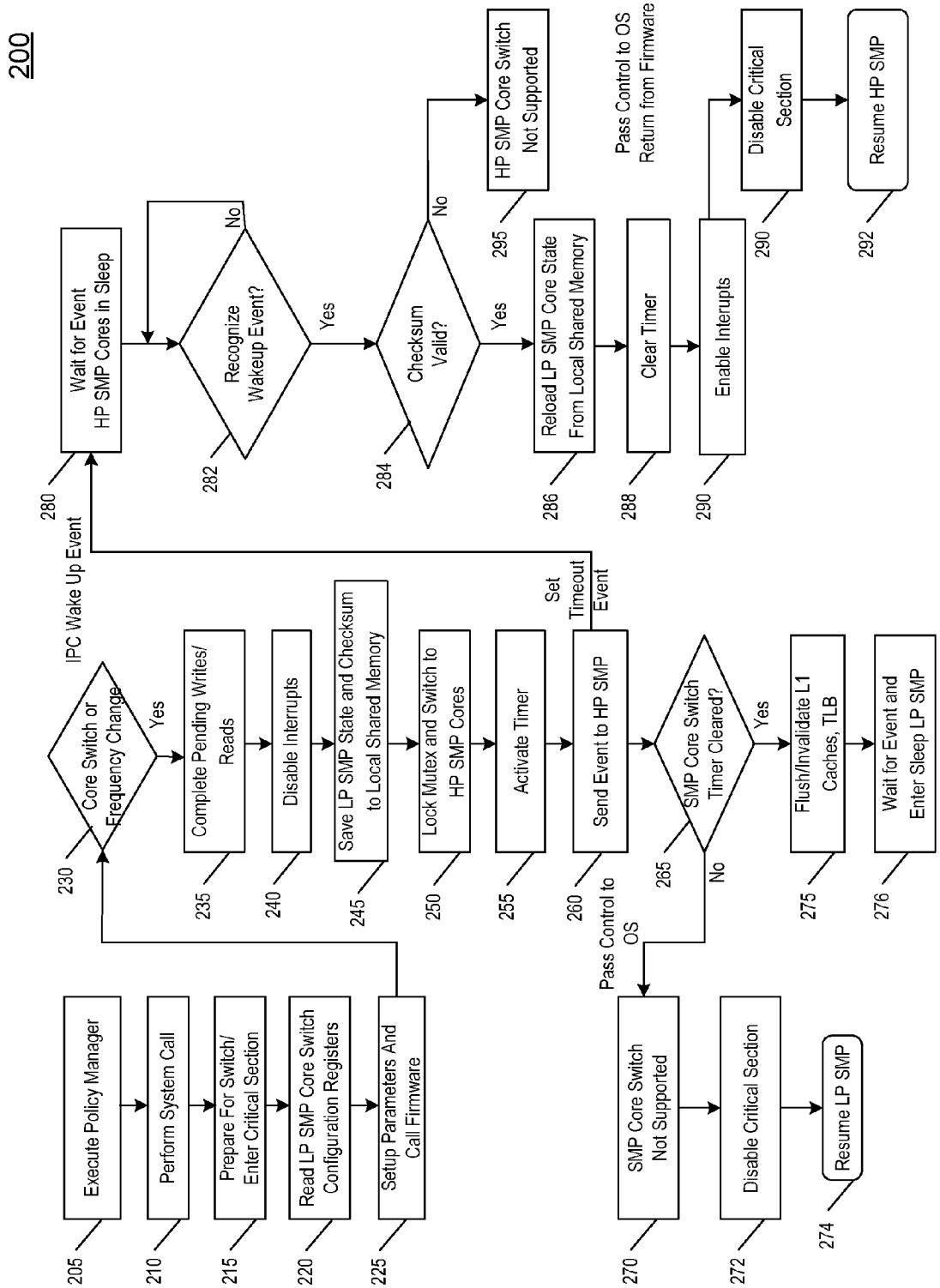
FIG. 2 is a flow diagram of a method for performing a core switch in accordance with an embodiment of the present invention.

Referring now to FIG. 2, shown is a flow diagram of a method for performing a core switch in accordance with an embodiment of the present invention. As shown in FIG. 2, various system components including hardware, software and/or firmware may be used in performing the method to achieve a switch between a core of a first type and a core of a second type. For ease of discussion, method 200 shown in FIG. 2 is with regard to a switch from a low power core to a high power core. Of course while shown in this manner in the example of FIG. 2, understand the scope of the present invention is not limited in this regard and embodiments apply equally to switching between a high power core and a low power core, and any other type of switch between heterogeneous compute elements within a processor. Furthermore, understand that embodiments are not limited to performing switching operations within a single processor such as a SoC. Instead, embodiments apply equally to other situations, such as switching between processing units configured in separate semiconductor dies or integrated circuits of a system.

As seen in FIG. 2, method 200 may begin by executing a policy manager (block 205). In various embodiments, this policy manager may perform a prediction-based analysis such as described above with regard to FIG. 1. In different implementations, this policy manager may be executed within code of an OS, firmware or other locations. And in still other embodiments, the policy manager may execute on a separate controller such as a microcontroller, e.g., a power control unit of an SoC or other processor. For purposes of discussion, assume that the policy manager executes on a low power SMP core of a SoC, e.g., as part of an OS.

Also assume for purposes of discussion here that the decision by the policy manager is to perform a core switch, namely from a low power core to a high power core. Then, control passes to block 210 where a kernel input output control (IOCTL) call may be performed. Note that in other embodiments such as where the policy manager is implemented in firmware, this call may be another type of system call. Responsive to this call, the SMP core may prepare for the switch by entering into a critical section (block 215). By way of this critical section, other extraneous operations and handling of other interrupts, break events and so forth may be disabled. Control next passes to block 220 where one or more core switch configuration registers may be read. Although the scope of the present invention is not limited in this regard, various information may be present in these configuration registers including an identification of the cores of the SoC and their status (e.g., active or in a sleep state). Next, control passes to block 225 where parameters may be set up to call firmware to perform the core switch. Note that the above described operations from execution of the policy manager to this call to firmware may be performed in OS code, in one embodiment.

However, the next set of operations may be performed, e.g., in firmware of the low power core. As seen, these operations may begin at diamond 230 by determining whether the requested operation is a core switch or a frequency change. As described above, for purposes of discussion the assumption is that a core switch is taking place. Understand that the above-described operations as well as the remainder of operations shown in FIG. 2 apply equally for performing a frequency change when the policy manager determines although a core switch is not indicated, a change in core frequency is indicated.

Assume for the discussion that the decision is for a core switch. Accordingly, at block 235 pending operations, e.g., any pending writes/reads within various buffers of the core, may be completed. Next, control passes to block 240 where interrupts may be disabled to thus prevent the core from handling any interrupts from external agents. Control next passes to block 245 where the state of the processor can be saved. More specifically, the state may be stored in a local memory such as a cache memory. Although the scope of the present invention is not limited in this regard, in one embodiment the state may be stored in a shared cache memory such as a level 2 (L2) cache that is accessible to other cores of the SoC. In addition to storage of the core state, which may include information stored in a variety of registers including architectural registers, configuration registers, control registers, status registers and so forth, a checksum also may be stored. This checksum may thus be a check value generated based on the entire state saved that can be later used to confirm that the correct state has been retrieved.

Referring still in FIG. 2, next a mutual exclusion location, namely a mutex, may be locked (block 250). This mutex may be a lock in a shared memory such as the L2 cache or a static random access memory (SRAM) that can be acquired to thus lock the state and prevent any other agent from accessing this information. This spin lock is acquired by the code running from SRAM. Because this memory is shared between the heterogeneous SMP cores, all such cores have access to the memory and can acquire the lock. Next, a timer may be activated (block 255). This timer may be set for a length of between approximately 20 and 100 microseconds, in one embodiment. Note that this timer may be a core switch timer that can be used to determine whether the core switch occurs within an expected time frame. By using a timer for performing the core switch, it can be ensured that the core switching is done efficiently with low latency. Control then passes to block 260 where an event can be sent to the high power core. In one embodiment this event may be a wake up event sent via an interprocessor communication (IPC).

Still referring to the operations performed in the firmware, control passes to diamond 265 to determine whether the core switch timer has cleared. If so, this indicates that the core switch to the high power core was successfully performed. As such, control next passes to block 275, where various structures of the low power core can be flushed/invalidated. Although the scope of the present invention is not limited in this regard, such structures may include a level 1 (L1) cache and a translation lookaside buffer (TLB). After flushing of this information, which may in one embodiment only include any modified or dirty information to speed up the invalidation operation, control passes to block 276 where the low power core can be placed into a sleep state. As such, this core will wait for an event to be awoken.

If the switch to the high power core was not successful as determined by the core switch timer not being cleared, control passes instead to block 270 where an indication that the core switch was not supported may be passed, e.g., to the OS. Accordingly at block 272 the critical section can be disabled and additional operations can occur on the low power core as it is resumed (block 274).

In the typical case when a core switch is successful, control passes to block 280 where the high power core, which can be assumed to be in a low power or sleep state, thus monitors for an event, namely this wake up event. This determination thus may be made at diamond 282 where the core recognizes a wake up event. Note that a periodic timer such as a wake up timer may be set in the high power core to allow it to periodically awaken to determine whether this wake event or any other break events are provided to it.

When the high power core wakes up responsive to this event control next passes to diamond 284 to determine whether the checksum is correct, based on accessing of the state and checksum via the mutex facility. As described above, a valid checksum may indicate that the state of the low power core stored in the shared memory is correct. Accordingly, control passes to block 286 where this state can be reloaded into the high power core. Next control passes to block 288 where the timer, namely the core switch timer, may be cleared. The high power core then enables interrupts at block 290 and control passes back from firmware execution (in an embodiment) to the OS at block 290 where the critical section can be disabled and normal operations can begin or resume on the high power core (block 292). If at diamond 284 it is determined that the checksum is not valid, control instead passes to block 295 where an indication that the core switch is not supported can be made. In one embodiment this indication can be sent to the other (low power) core. Although shown at this high level in the embodiment of FIG. 2, understand the scope of the present invention is not limited in this regard.

Figure 3:
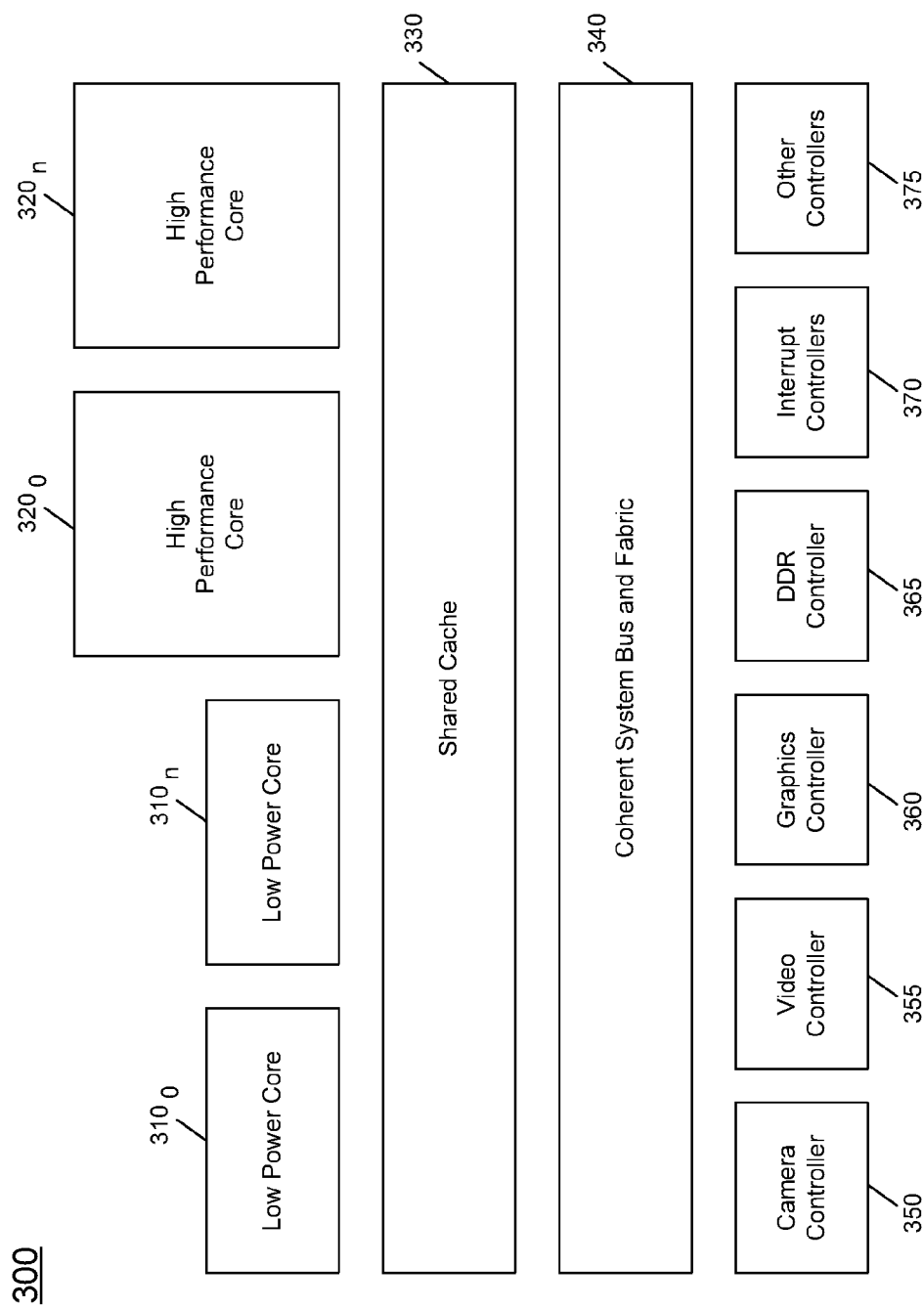
FIG. 3 is a block diagram of a processor in accordance with an embodiment of the present invention.

Understand that embodiments may be applicable to many different types of processors. Referring now to FIG. 3, shown is a block diagram of a processor in accordance with an embodiment of the present invention. As shown in FIG. 3, processor 300 may be implemented as an SoC that includes a variety of components configured on a single semiconductor die, e.g., as a single IC package. In the particular embodiment shown, a plurality of cores may be present. More specifically, a plurality of low power cores $310_0$-$310_n$ may be present. In addition, a plurality of high power cores may also be present. In the embodiment shown high power cores $320_0$-$320_n$ may be present.

In an embodiment, the low power cores may operate at a frequency between 0 and 600 megahertz (MHz), while the high power cores may operate at a frequency between 600 MHz and 2.5 gigahertz (GHz). In some embodiments these cores may be of a homogeneous design, although the low power cores operate a lower frequency level. However, in many embodiments these cores may be of heterogeneous designs. For example, the low power cores may be relatively simple in-order processors such as a core based on an Intel® Atom™ design. Instead, the high power cores may be of a more complicated out-of-order design such as an Intel® Architecture (IA) 32 core such as an Intel Core™ design. Note that each of the cores may include various structures including front end units, execution units, back end units and so forth. In addition one or more levels of cache memories may be present within each core. All of the cores may be coupled to a shared cache 330, which in an embodiment may be an L2 cache that in turn is coupled to a coherent system bus and fabric 340 to provide interconnection to a variety of different components that may be coupled to the SoC via a set of controllers. In the embodiment shown, such controllers may include a camera controller 350, a video controller 355, a graphics controller 360, a memory controller 365 (such as a double data rate (DDR) memory controller), one or more interrupt controllers 370, in addition to other controllers 375. Although shown at this high level in the embodiment of FIG. 3, understand the scope of the present invention is not limited in this regard.

Using an embodiment of the present invention, overhead associated with core switching may be minimized, thus decreasing latency for switching, eliminating thrashing and achieving predictable dynamic switching of SMP cores, thereby reducing software complexities.

Depending upon the performance requirements for a plurality of future execution quanta (e.g., a next quantum and a following quantum (t and t+1)), core switching may occur dynamically and completely transparently to operating system and software applications. Since the heterogeneous cores each have different power performance characteristics, a switching threshold can be tuned to a specific implementation of an SoC. For example, if a prediction is for a frequency of 700 MHz (and assuming an upper threshold of 600 MHz), a determination of a core switch from a low power core to high power core may occur.

Table 1 shows the output of the policy manager that determines whether to dynamically switch SMP cores based on a prediction algorithm in accordance with one embodiment of the present invention.

In various embodiments, the policy manager may determine according to a policy one or more selected cores of the SoC to enable based on one or more of these parameters, which is seen in the matrix of Table 1. For example, in one embodiment the predicted processor utilization (e.g., in terms of frequency) itself may be used to determine whether cores of a particular type are to be enabled or disabled. Also understand that the implementation shown in Table 1 is for a multicore processor including two low power cores and two high power cores, where the policy is simplified by enabling two and only two cores, either low power cores or high power cores. Of course in other embodiments, different combinations of cores can be enabled, including zero cores, one low power core, one high power core, or different combinations of low power and high power cores. In addition, understand that in other embodiments more than two heterogeneous types of cores may be present, and further understand that SoCs including many more than four cores also may incorporate an embodiment of the present invention.

Figure 4:
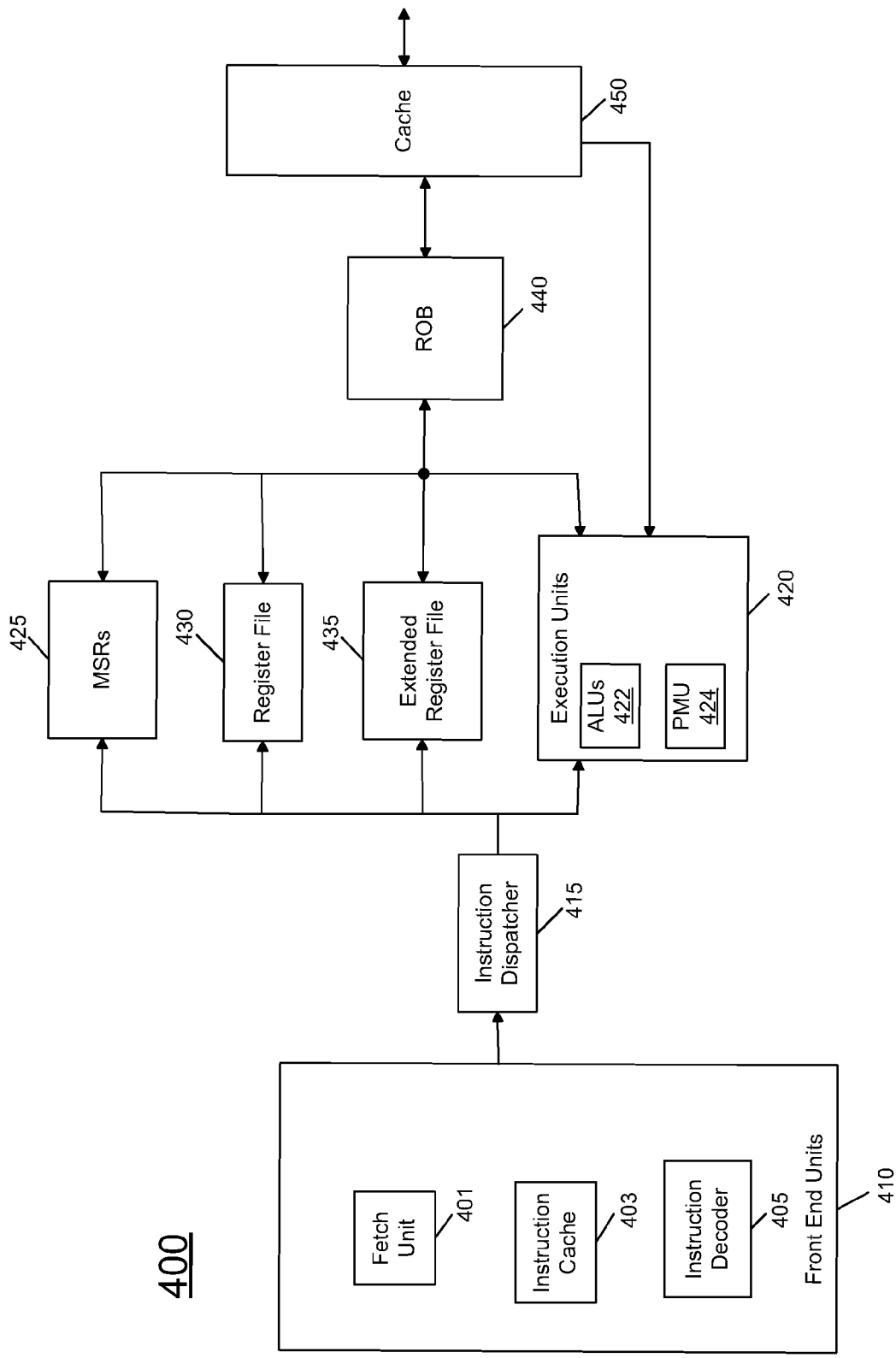
FIG. 4 is a block diagram of a processor core in accordance with one embodiment of the present invention.

Referring now to FIG. 4, shown is a block diagram of a processor core in accordance with one embodiment of the present invention. As shown in FIG. 4, processor core 400 may be a multi-stage pipelined out-of-order processor. Processor core 400 is shown with a relatively simplified view in FIG. 4, and may correspond to one of the cores of a SoC as described herein. One or more other cores of the SoC may include the same architecture, while one or more other cores may be of a different architecture, such as an in-order core.

As shown in FIG. 4, core 400 includes front end units 410, which may be used to fetch instructions to be executed and prepare them for use later in the processor. For example, front end units 410 may include a fetch unit 401, an instruction cache 403, and an instruction decoder 405. In

TABLE 1

| | IPC | | | Performance Policy | | | |
|---|---|---|---|---|---|---|---|
| Current IPC | Predicted CPU Utilization | Memory Statistics | State of System | Low Power SMP Core | Low Power SMP Core | High Performance SMP Core | High Performance SMP Core |
| IPC < 0.5 | 0-600 | % Data Cache Misses > 10% | Memory Bound | Enabled | Enabled | Disabled | Disabled |
| IPC < 0.5 | 600-1000 | % Data Cache Misses > 10% | Memory Bound | Disabled | Disabled | Enabled | Enabled |
| IPC > 0.5 | 600-1000 | % Data Cache Misses < 10% | CPU Bound | Disabled | Disabled | Enabled | Enabled |
| IPC > 1.0 | 600-2500 | % Data Cache Misses > 10% | Memory and CPU Bound | Disabled | Disabled | Enabled | Enabled |
| IPC < 0.5 | 0-600 | % Data Cache Misses < 10% | Low MIPS Active and Idle | Enabled | Enabled | Disabled | Disabled |

In Table 1, various characterizable parameters of a system are shown. Based on one or more of these parameters, the policy manager may determine a performance policy for a given future quantum. As seen, the parameters include a current instructions per cycle (IPC), a predicted CPU utilization (e.g., in terms of frequency). In addition, memory utilization information such as a number of cache misses as a percentage of memory requests may be identified. From these parameters, a system may be in a given state such as a memory bound state, a CPU bound state, or a low activity state.

some implementations, front end units 410 may further include a trace cache, along with microcode storage as well as a micro-operation storage. Fetch unit 401 may fetch macro-instructions, e.g., from memory or instruction cache 403, and feed them to instruction decoder 405 to decode them into primitives, i.e., micro-operations for execution by the processor Coupled between front end units 410 and execution units 420 is an instruction dispatcher 415 which can be implemented as out-of-order logic in out-of-order implementations to receive the micro-instructions and prepare them for execution. More specifically instruction dispatcher 415 may include various buffers to allocate various resources needed for execution, as well as to provide renaming of logical registers onto storage locations within various register files such as register file 430 and extended register file 435. Register file 430 may include separate register files for integer and floating point operations. Extended register file 435 may provide storage for vector-sized units, e.g., 256 or 512 bits per register.

As further seen in FIG. 4, processor 400 may include a set of model specific registers (MSRs) 425. Various types of model specific information may be stored in such registers. In some embodiments, such registers may include information regarding execution characteristics or occurrences such as interrupts, traps, exceptions and so forth.

Various resources may be present in execution units 420, including, for example, various integer, floating point, and single instruction multiple data (SIMD) logic units, among other specialized hardware. For example, such execution units may include one or more arithmetic logic units (ALUs) 422. In addition, execution units may further include a performance monitoring unit (PMU) 424. In various embodiments, PMU 424 may be used to control obtaining of various information, e.g., profiling counters, information in MSRs and so forth. In particular implementations here, PMU 424 or other such logic may be used to provide processor utilization information for use by a policy manager.

Results of execution in the execution units may be provided to retirement logic, namely a reorder buffer (ROB) 440. More specifically, ROB 440 may include various arrays and logic to receive information associated with instructions that are executed. This information is then examined by ROB 440 to determine whether the instructions can be validly retired and result data committed to the architectural state of the processor, or whether one or more exceptions occurred that prevent a proper retirement of the instructions. Of course, ROB 440 may handle other operations associated with retirement.

As shown in FIG. 4, ROB 440 is coupled to a cache 450 which, in one embodiment may be a low level cache (e.g., an L1 cache) although the scope of the present invention is not limited in this regard. Also, execution units 420 can be directly coupled to cache 450. While shown with this high level in the embodiment of FIG. 4, understand the scope of the present invention is not limited in this regard.

Figure 5:
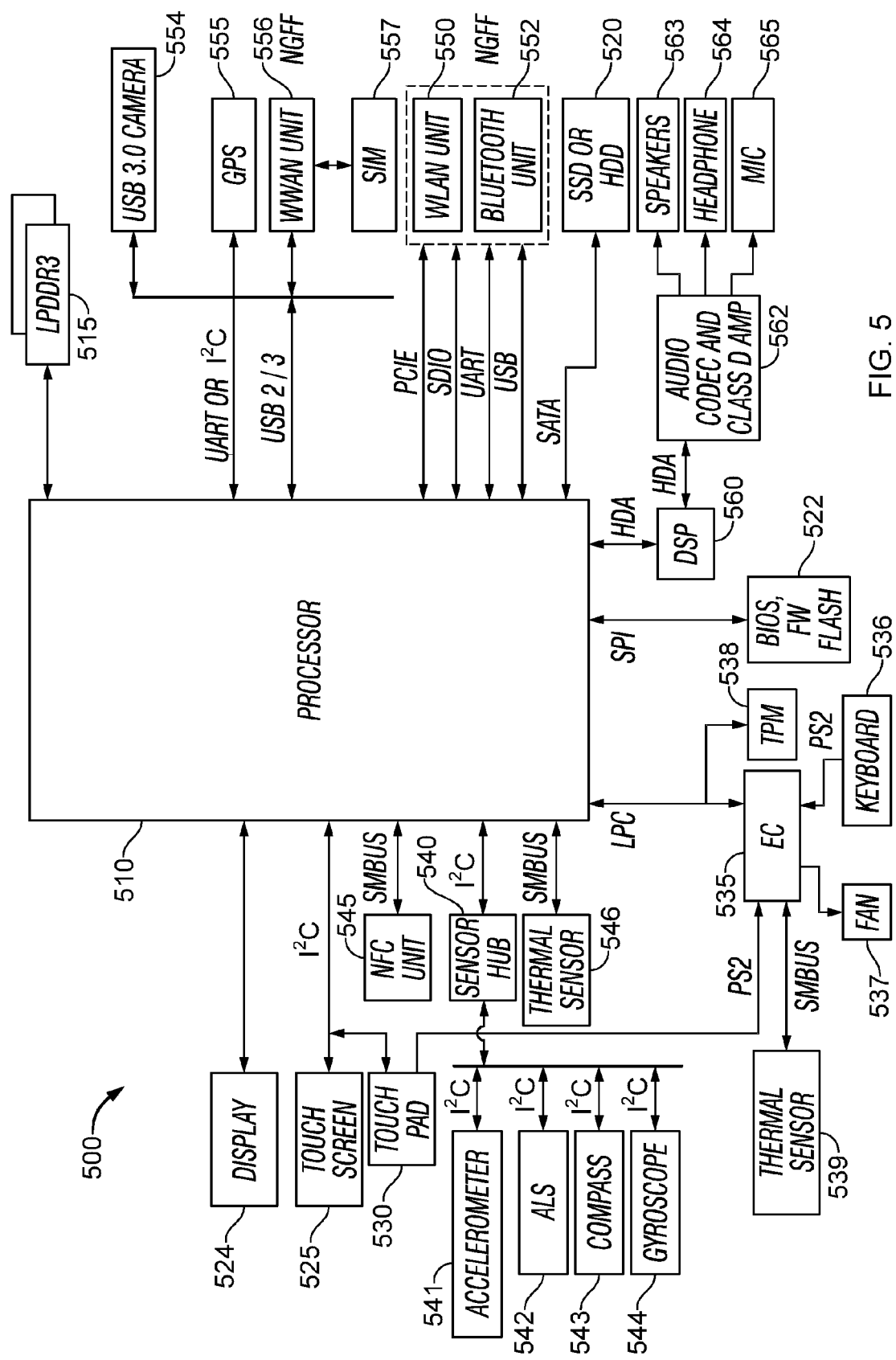
FIG. 5 is a block diagram of components present in a computer system in accordance with an embodiment of the present invention.

Referring now to FIG. 5, shown is a block diagram of components present in a computer system in accordance with an embodiment of the present invention. As shown in FIG. 5, system 500 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 5 is intended to show a high level view of many components of the computer system. However, it is to be understood that additional components may be present in certain implementations and furthermore, different arrangement of the components shown may occur in other implementations.

As seen in FIG. 5, a processor 510, which may be a low power multicore processor socket such as an ultra low voltage processor, may act as a main processing unit and central hub for communication with the various components of the system. Such processor can be implemented as a system on a chip (SoC). In one embodiment, processor 510 may be an Intel® Architecture Core™-based processor such as an i3, i5, i7 or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 processor. Regardless, processor 510 may provide for dynamic workload switching between different cores based on prediction operations as described herein.

Processor 510 may communicate with a system memory 515, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 510 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

To provide for persistent storage of information such as data, applications, one or more operating systems and so forth, a mass storage 520 may also couple to processor 510. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 5, a flash device 522 may be coupled to processor 510, e.g., via a serial peripheral interface (SPI). This flash device may provide for non-volatile storage of system software, including a basic input/output software (BIOS) as well as other firmware of the system.

Various input/output (IO) devices may be present within system 500. Specifically shown in the embodiment of FIG. 5 is a display 524 which may be a high definition LCD or LED panel configured within a lid portion of the chassis. This display panel may also provide for a touch screen 525, e.g., adapted externally over the display panel such that via a user's interaction with this touch screen, user inputs can be provided to the system to enable desired operations, e.g., with regard to the display of information, accessing of information and so forth. In one embodiment, display 524 may be coupled to processor 510 via a display interconnect that can be implemented as a high performance graphics interconnect. Touch screen 525 may be coupled to processor 510 via another interconnect, which in an embodiment can be an I²C interconnect. As further shown in FIG. 5, in addition to touch screen 525, user input by way of touch can also occur via a touch pad 530 which may be configured within the chassis and may also be coupled to the same I²C interconnect as touch screen 525.

For perceptual computing and other purposes, various sensors may be present within the system and can be coupled to processor 510 in different manners. Certain inertial and environmental sensors may couple to processor 510 through a sensor hub 540, e.g., via an I²C interconnect. In the embodiment shown in FIG. 5, these sensors may include an accelerometer 541, an ambient light sensor (ALS) 542, a compass 543 and a gyroscope 544. Other environmental sensors may include one or more thermal sensors 546 which may couple to processor 510 via a system management bus (SMBus) bus, in one embodiment.

Also seen in FIG. 5, various peripheral devices may couple to processor 510 via a low pin count (LPC) interconnect. In the embodiment shown, various components can be coupled through an embedded controller 535. Such components can include a keyboard 536 (e.g., coupled via a PS2 interface), a fan 537, and a thermal sensor 539. In some embodiments, touch pad 530 may also couple to EC 535 via a PS2 interface. In addition, a security processor such as a trusted platform module (TPM) 538 in accordance with the Trusted Computing Group (TCG) TPM Specification Version 1.2, dated Oct. 2, 2003, may also couple to processor 510 via this LPC interconnect.

System 500 can communicate with external devices in a variety of manners, including wirelessly. In the embodiment shown in FIG. 5, various wireless modules, each of which can correspond to a radio configured for a particular wireless communication protocol, are present. One manner for wireless communication in a short range such as a near field may be via a near field communication (NFC) unit 545 which may communicate, in one embodiment with processor 510 via an SMBus. Note that via this NFC unit 545, devices in close proximity to each other can communicate. For example, a user can enable system 500 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 5, additional wireless units can include other short range wireless engines including a WLAN unit 550 and a Bluetooth unit 552. Using WLAN unit 550, Wi-Fi™ communications in accordance with a given Institute of Electrical and Electronics Engineers (IEEE) 802.11 standard can be realized, while via Bluetooth unit 552, short range communications via a Bluetooth protocol can occur. These units may communicate with processor 510 via, e.g., a USB link or a universal asynchronous receiver transmitter (UART) link. Or these units may couple to processor 510 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications, e.g., according to a cellular or other wireless wide area protocol, can occur via a WWAN unit 556 which in turn may couple to a subscriber identity module (SIM) 557. In addition, to enable receipt and use of location information, a GPS module 555 may also be present. Note that in the embodiment shown in FIG. 5, WWAN unit 556 and an integrated capture device such as a camera module 554 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 560, which may couple to processor 510 via a high definition audio (HDA) link. Similarly, DSP 560 may communicate with an integrated coder/decoder (CODEC) and amplifier 562 that in turn may couple to output speakers 563 which may be implemented within the chassis. Similarly, amplifier and CODEC 562 can be coupled to receive audio inputs from a microphone 565 which in an embodiment can be implemented via dual array microphones to provide for high quality audio inputs to enable voice-activated control of various operations within the system. Note also that audio outputs can be provided from amplifier/CODEC 562 to a headphone jack 564. Although shown with these particular components in the embodiment of FIG. 5, understand the scope of the present invention is not limited in this regard.

Figure 6:
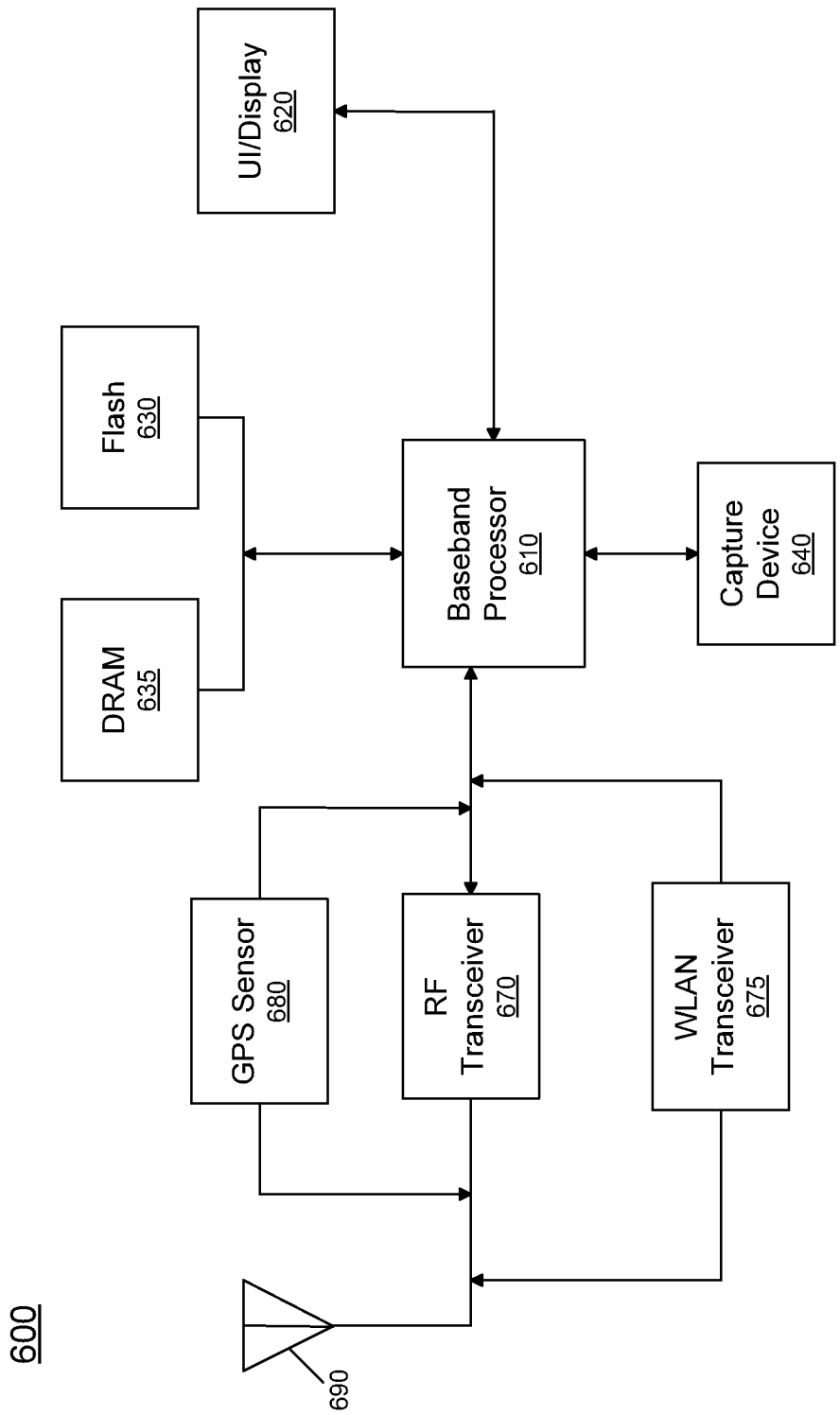
FIG. 6 is a block diagram of an example system with which embodiments can be used.

Embodiments can be used in many different environments. Referring now to FIG. 6, shown is a block diagram of an example system 600 with which embodiments can be used. As seen, system 600 may be a smartphone or other wireless communicator. As shown in the block diagram of FIG. 6, system 600 may include a baseband processor 610 which can include heterogeneous cores that can be dynamically controlled to switch a workload between different core types based on predictions made as described herein. In general, baseband processor 610 can perform various signal processing with regard to communications, as well as perform computing operations for the device. In turn, baseband processor 610 can couple to a user interface/display 620 which can be realized, in some embodiments by a touch screen display. In addition, baseband processor 610 may couple to a memory system including, in the embodiment of FIG. 6 a non-volatile memory, namely a flash memory 630 and a system memory, namely a dynamic random access memory (DRAM) 635. As further seen, baseband processor 610 can further couple to a capture device 640 such as an image capture device that can record video and/or still images.

To enable communications to be transmitted and received, various circuitry may be coupled between baseband processor 610 and an antenna 690. Specifically, a radio frequency (RF) transceiver 670 and a wireless local area network (WLAN) transceiver 675 may be present. In general, RF transceiver 670 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 680 may be present. Other wireless communications such as receipt or transmission of radio signals, e.g., AM/FM and other signals may also be provided. In addition, via WLAN transceiver 675, local wireless signals, such as according to a Bluetooth™ standard or an IEEE 802.11 standard such as IEEE 802.11a/b/g/n can also be realized.

Although shown at this high level in the embodiment of FIG. 6, understand the scope of the present invention is not limited in this regard.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments.

In an embodiment, an apparatus includes a first core to execute instructions and a second core to execute instructions. The second core can be asymmetric with respect to the first core and have a higher power consumption level than the first core. In turn, a policy manager is to receive operating system scheduling information, performance prediction information for at least one future quantum, and current processor utilization information, and to determine a performance prediction for a future quantum and whether to cause a switch between the first core and the second core based at least in part on the operating system scheduling information, the performance prediction information, and the current processor utilization information.

A performance monitoring unit can provide the current processor utilization information to the policy manager.

The policy manager may be firmware to execute on one of the first and second cores. The policy manager alternately may be a power controller of a multicore processor configured on a single semiconductor die.

The operating system scheduling information may include, for each of a plurality of future quanta, a number of processes and a number of threads to be executed. The current processor utilization information may include instructions per cycle and a processor utilization rate.

The policy manager can determine whether to cause a change to a frequency of at least one of the first and second cores.

In an embodiment, a plurality of first cores each homogenous with respect to the first core and a plurality of second cores each homogeneous with respect to the second core may be present, where the policy manager is to determine whether to switch a workload executed on at least some of the plurality of first cores to at least some of the plurality of second cores based on the performance prediction for the future quantum.

The policy manager can issue a call to cause an OS that executes on the first core to enter into a critical section and to enable the apparatus to switch execution of the OS to the second core transparently to the OS.

The first core may save a state of the first core to a shared memory, lock a mutual exclusion location, and activate a timer prior to the OS execution switch. The first core may also invalidate a cache of the first core if the timer is cleared during execution of the OS on the second core prior to an expiration of the timer. The first core can also cause the OS to disable the critical section and resume execution on the first core if the timer is not cleared prior to the timer expiration.

In an embodiment, the apparatus is a SoC including the first and second cores, and the policy manager is to execute on an enabled one of the first and second cores.

In another embodiment, a method includes receiving a call in a first core of a multicore processor from a policy manager indicating a change to a processor operating parameter, performing a set of actions to complete pending accesses and to prevent interrupts to the first core, storing a state of the first core in a shared memory coupled to the first core and setting a mutual exclusion location of the shared memory, and initiating a timer and determining if the timer is cleared prior to an expiration of the timer.

The processor operating parameter may be a core switch between the first core and a second core to cause a workload to be moved from the first core to the second core, and an event can be sent from the first core to the second core after initiating the timer to cause the second core to wake up.

The method may further include causing the first core to enter into a low power state responsive to determining that the timer is cleared prior to the timer expiration.

The method may further include causing the first core to resume execution of the workload responsive to the timer expiration, without the core switch.

The method may further include saving a checksum of the first core state in the shared memory with the first core state, and accessing the first core state and the checksum via the second core and determining whether the checksum is valid.

The method may further include loading the first core state into the second core responsive to determining that the checksum is valid, and thereafter clearing the timer, and not clearing the timer responsive to determining that the checksum is not valid.

In another embodiment, an article includes at least one storage medium including instructions that when executed enable a multicore processor to receive operating system scheduling information regarding processes and threads to be executed in a plurality of future quanta, performance prediction information for at least one future quantum, and current processor utilization information, and to determine whether to cause a switch between a first core and a second core of the multicore processor (where the first and second cores are heterogeneous compute elements), based at least in part on the operating system scheduling information, the performance prediction information, and the current processor utilization information, and issue a call to the first core to indicate the switch, where responsive to the call the first core is to store a state of the first core in a shared memory and set a mutual exclusion location of the shared memory, initiate a timer, and determine whether the timer is cleared prior to an expiration of the timer.

The article may further include instructions to cause the first core to enter into a low power state responsive to determining that the timer is cleared prior to the timer expiration.

The article may further include instructions to cause the multicore processor to resume execution of the workload on the first core responsive to the timer expiration, without the switch.

The article may further include instructions to cause the multicore processor to save a checksum of the first core state in the shared memory with the first core state, and access the first core state and the checksum to determine whether the checksum is valid, and if so to resume execution of the workload on the second core, and to clear the timer.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first core to execute instructions;
a second core to execute instructions, the second core asymmetric with respect to the first core and having a higher power consumption level than the first core; and
a microcontroller coupled to the first and second cores, the microcontroller comprising a policy manager to receive operating system scheduling information, performance prediction information for at least one future quantum, and current processor utilization information, and to determine a performance prediction for a future quantum and whether to cause a switch between the first core and the second core in the future quantum based at least in part on the performance prediction and responsive to a determination to cause the switch, store an identification of the switch in a core switch queue to later be accessed when a thread quanta is to execute in the future quantum, wherein the policy manager is to access the identification in the core switch queue in proximity to the future quantum, issue a call to cause an operating system (OS) to enter into a critical section and to enable the apparatus to switch execution of the OS to the second core, wherein the first core is to save a state of the first core to a shared memory, lock a mutual exclusion location comprising a lock in the shared memory and activate a timer prior to the OS execution switch, and the second core is to acquire the lock of the mutual exclusion location in the shared memory and access the state of the first core from the shared memory.

2. The apparatus of claim 1, wherein the microcontroller is included in a power controller of a processor, the processor corresponding to a multicore processor configured on a single semiconductor die.

3. The apparatus of claim 1, wherein the operating system scheduling information includes, for each of a plurality of future quanta, a number of processes and a number of threads to be executed.

4. The apparatus of claim 3, wherein the current processor utilization information includes instructions per cycle and a processor utilization rate.

5. The apparatus of claim 1, wherein the policy manager is to determine whether to cause a change to a frequency of at least one of the first and second cores.

6. The apparatus of claim 1, further comprising a plurality of first cores each homogenous with respect to the first core, and a plurality of second cores each homogeneous with respect to the second core, and wherein the policy manager is to determine whether to switch a workload executed on at least some of the plurality of first cores to at least some of the plurality of second cores based on the performance prediction for the future quantum.

7. The apparatus of claim 1, wherein the first core is to invalidate a cache of the first core if the timer is cleared during execution of the OS on the second core prior to an expiration of the timer.

8. The apparatus of claim 7, wherein the first core is to cause the OS to disable the critical section and to resume execution on the first core if the timer is not cleared prior to the timer expiration.

9. The apparatus of claim 1, wherein the apparatus comprises a system on chip (SoC) including the first core and the second core.

10. An article comprising at least one non-transitory storage medium including instructions that when executed enable a multicore processor to:
receive operating system scheduling information regarding processes and threads to be executed in a plurality of future quanta, performance prediction information for at least one future quantum, and current processor utilization information, and to determine whether to cause a switch between a first core and a second core of the multicore processor in a first future quantum, the first and second cores heterogeneous compute elements, based at least in part on the operating system scheduling information, the performance prediction information, and the current processor utilization information;
store an identification for the switch in a core switch queue to later be accessed when a thread quanta is to execute in the first future quantum; and
in proximity to the first future quantum, access the identification for the switch in the core switch queue and issue a call to the first core to indicate the switch, wherein responsive to the call, the first core is to store a state of the first core in a shared memory and set a mutual exclusion location of the shared memory comprising a lock in the shared memory, initiate a timer, and determine whether the timer is cleared prior to an expiration of the timer, the lock of the mutual exclusion location to be acquired by the second core to enable the second core to access the state of the first core stored in the shared memory.

11. The article of claim 10, wherein the at least one non-transitory storage medium further includes instructions to cause the first core to enter into a low power state responsive to determining that the timer is cleared prior to the timer expiration.

12. The article of claim 11, wherein the at least one non-transitory storage medium further includes instructions to cause the multicore processor to resume execution of the workload on the first core responsive to the timer expiration, without the switch.

13. The article of claim 10, wherein the at least one non-transitory storage medium further includes instructions to cause the multicore processor to:
save a checksum of the first core state in the shared memory with the first core state; and
access the first core state and the checksum to determine whether the checksum is valid, and if so to resume execution of the workload on the second core, and to clear the timer.

14. A system on chip (SoC) comprising:
a first core to execute instructions;
a second core to execute instructions, the second core asymmetric with respect to the first core and having a higher power consumption level than the first core;

a core switch queue;

a policy manager to receive operating system scheduling information, performance prediction information for at least one future quantum, and current processor utilization information, determine a performance prediction for a future quantum and whether to cause a switch between the first core and the second core in the future quantum based at least in part on the performance prediction, and responsive to a determination to cause the switch, store an identification of the switch in the core switch queue to later be accessed when a thread quanta is to execute in the future quantum, wherein the policy manager is to access the identification in the core switch queue in proximity to the future quantum and enable the SoC to switch execution of the OS to the second core transparently to the OS, wherein the first core is to save a state of the first core to a shared memory, lock a mutual exclusion location in a shared memory and activate a timer prior to the OS execution switch, and the second core is to acquire the lock of the mutual exclusion location in the shared memory and access the state of the first core from the shared memory; and a memory controller coupled to the first core and the second core.

15. The SoC of claim 14, further comprising a third core and a fourth core.

16. The SoC of claim 14, wherein the operating system scheduling information includes, for each of a plurality of future quanta, a number of processes and a number of threads to be executed.

17. The SoC of claim 16, wherein the current processor utilization information includes instructions per cycle and a processor utilization rate.

18. The SoC of claim 14, further comprising at least one of a camera controller and a video controller.

19. The SoC of claim 14, further comprising a plurality of first cores each homogenous with respect to the first core, and a plurality of second cores each homogeneous with respect to the second core, and wherein the policy manager is to determine whether to switch a workload executed on at least some of the plurality of first cores to at least some of the plurality of second cores based on the performance prediction.

* * * * *